United States Patent
Kajita et al.

(10) Patent No.: US 12,382,011 B2
(45) Date of Patent: Aug. 5, 2025

(54) SIGNAL PROCESSING APPARATUS

(71) Applicant: CANON KABUSHIKI KAISHA, Tokyo (JP)

(72) Inventors: Hajime Kajita, Kanagawa (JP); Masahiro Sato, Tokyo (JP); Hirofumi Urabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 18/516,667

(22) Filed: Nov. 21, 2023

(65) Prior Publication Data

US 2024/0179295 A1    May 30, 2024

(30) Foreign Application Priority Data

Nov. 29, 2022 (JP) ................... 2022-190840

(51) Int. Cl.
*H04N 17/00* (2006.01)
*H04N 21/435* (2011.01)

(52) U.S. Cl.
CPC ........... *H04N 17/00* (2013.01); *H04N 21/435* (2013.01)

(58) Field of Classification Search
CPC ...... H04N 17/00; H04N 21/435; G09G 5/006; G09G 2330/12; G09G 2370/04; G09G 3/20
See application file for complete search history.

(56) References Cited

U.S. PATENT DOCUMENTS

| | | | |
|---|---|---|---|
| 2004/0267742 A1* | 12/2004 | Polson | G11B 27/11 707/999.005 |
| 2005/0080743 A1* | 4/2005 | Ostrover | G06F 21/10 705/50 |
| 2005/0185201 A1* | 8/2005 | Kuwata | G06T 7/194 358/1.9 |
| 2015/0062298 A1* | 3/2015 | Choo | H04N 13/194 348/43 |
| 2020/0302182 A1* | 9/2020 | Ahn | G06V 20/46 |
| 2023/0274389 A1* | 8/2023 | Park | G06T 3/40 382/276 |

FOREIGN PATENT DOCUMENTS

JP      2019047223 A    3/2019
WO   WO-2022108201 A1 *  5/2022  ............... G06T 3/40

OTHER PUBLICATIONS

English Translation of WO 2022/108201 (Year: 2022).*
SMPTE Standard, SMPTE ST 2082-10:2018, https://pub.smpte.org/latest/st2082-10/st2082-10-2018.pdf (Year: 2018).*

* cited by examiner

*Primary Examiner* — Kyu Chae
(74) *Attorney, Agent, or Firm* — Canon U.S.A., Inc. IP Division

(57) ABSTRACT

A signal processing apparatus includes one or more memories storing instructions, and one or more processors executing the instructions to acquire metadata from a video signal, detect an error of the metadata, and correct, in a case where the error has been detected, the error of the metadata.

13 Claims, 10 Drawing Sheets

FIG.2

| IMAGE QUALITY SETTING ITEMS | SETTING INFORMATION |
|---|---|
| GAMMA/EOTF | 2.2/HLG/PQ |
| COLOR GAMUT | BT.709/BT.2020 |

FIG.4

| TRANSFER CHARACTERISTICS ACQUIRED FROM INPUT SIGNAL | GAMMA/EOTF SETTING OF DISPLAY APPARATUS | CORRECTION RESULT |
|---|---|---|
| SDR-TV (INITIAL VALUE) | GAMMA 2.2 | — |
| SDR-TV (INITIAL VALUE) | HLG | HLG |
| SDR-TV (INITIAL VALUE) | PQ | PQ |
| HLG | GAMMA 2.2 | — |
| HLG | HLG | — |
| HLG | PQ | — |
| PQ | GAMMA 2.2 | — |
| PQ | HLG | — |
| PQ | PQ | — |

FIG.5

| OUTPUT SETTING ITEMS | SETTING INFORMATION |
|---|---|
| METADATA CORRECTION TYPE | AUTO/COORDINATION WITH IMAGE QUALITY SETTING/MANUAL/OFF |
| TRANSFER CHARACTERISTICS | SDR-TV/HLG/PQ |
| COLORIMETRY | ITU-R BT.709/ITU-R BT.2020 |

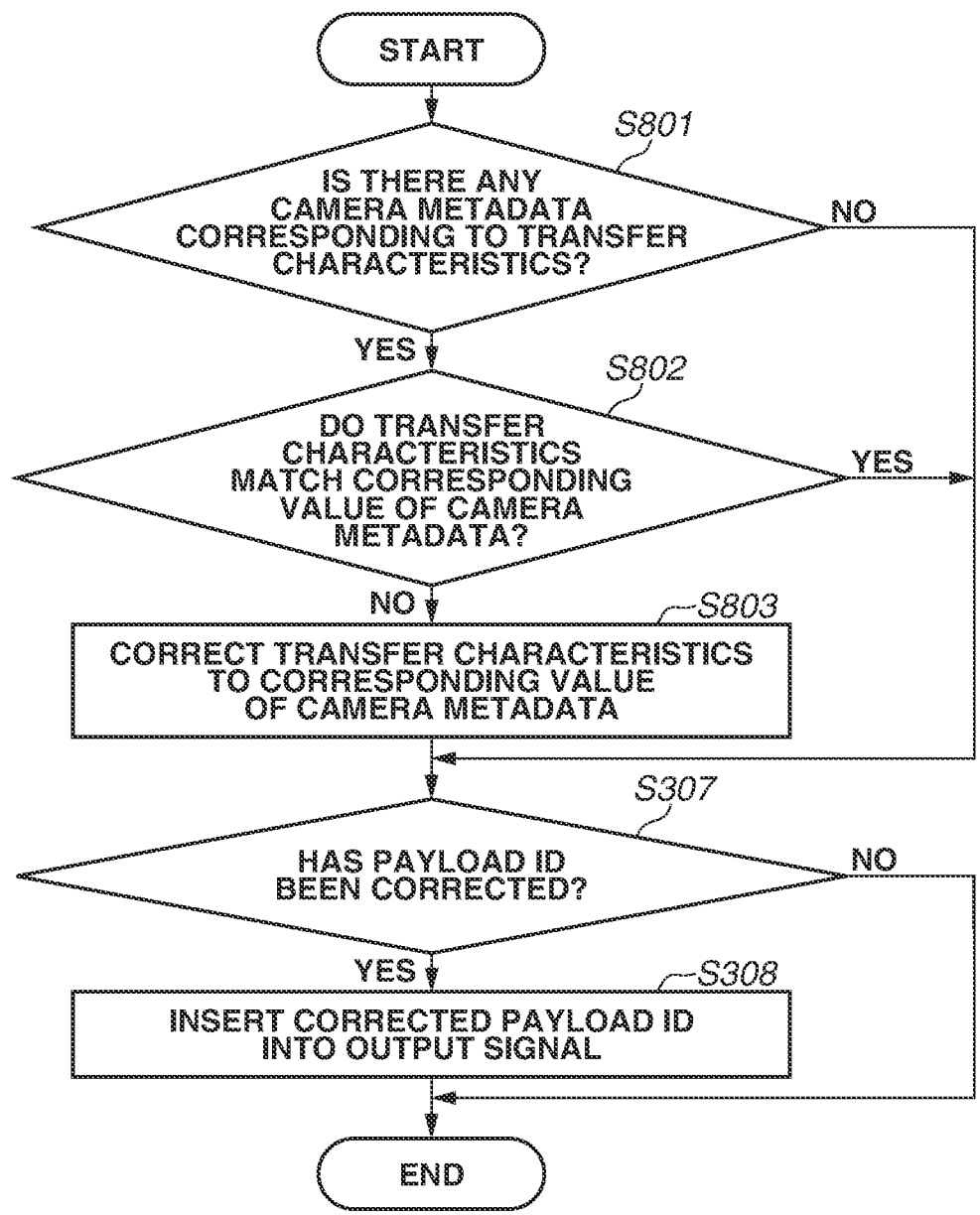

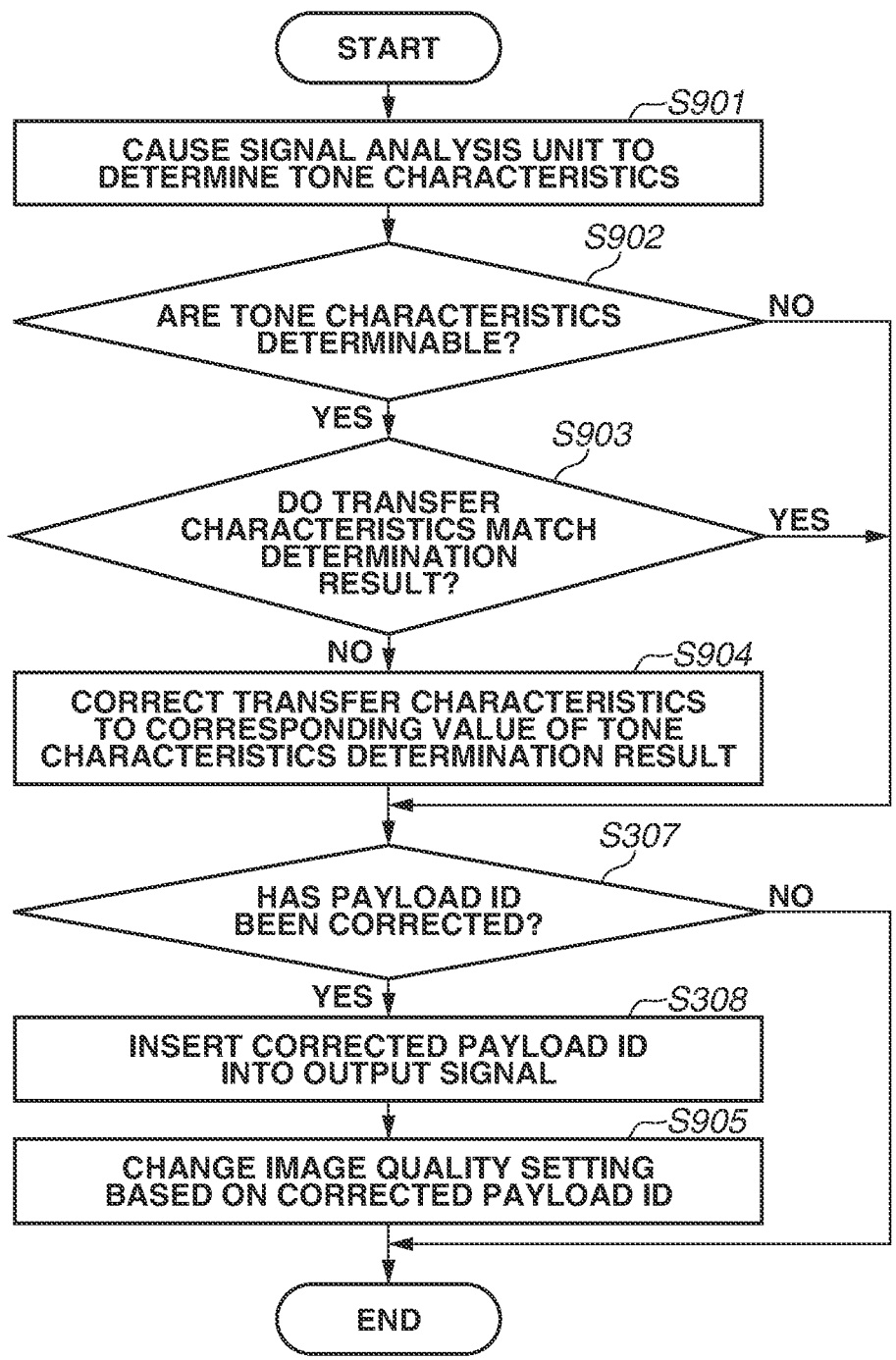

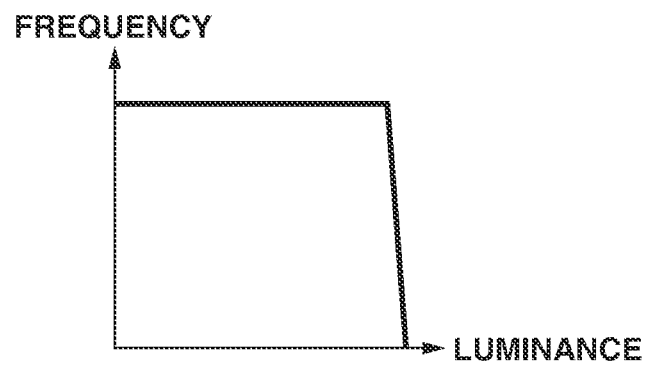
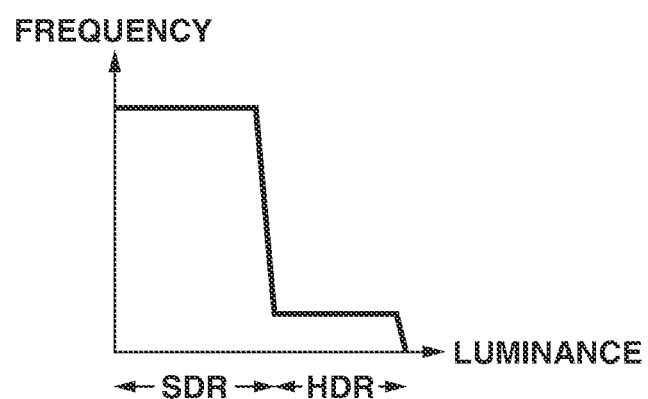
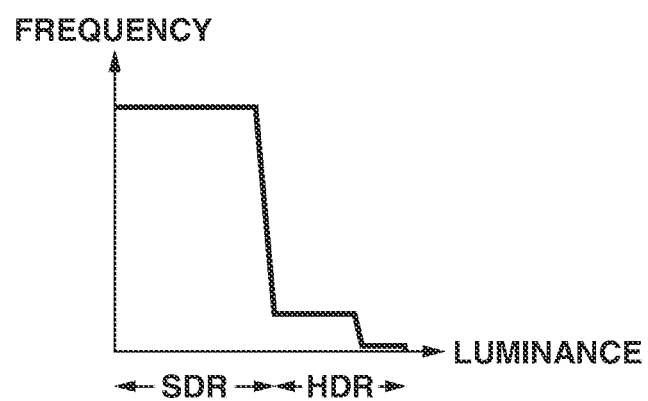

SIGNAL PROCESSING APPARATUS

BACKGROUND OF THE DISCLOSURE

Field of the Disclosure

The exemplary embodiments of the present disclosure relate to a technique of correcting an error of metadata in a video signal.

Description of the Related Art

In the video signal transmission standards, not only pixel information about videos but also how information other than the pixel information is inserted as metadata is standardized. Examples of the metadata include ancillary (ANC) data, which is stored in a blanking part defined in Serial Digital Interface (SDI), and data, which is stored in InfoFrame defined in High-Definition Multimedia Interface (HDMI). In addition, Society of Motion Picture and Television Engineers (SMPTE) standardizes SMPTE ST 352 in which a payload ID is defined as one of the ANC data of an SDI signal. Examples of the parameters to be sent in the payload ID include Standard Dynamic Range (SDR-TV), Hybrid Log Gamma (HLG), and Perceptual Quantizer (PQ), which are indicated as a setting value of the transfer characteristics, and BT.709 and BT.2020, which are indicated as a setting value of colorimetry.

Some of the output apparatuses, such as video reproduction apparatuses, add inaccurate data to metadata and output the metadata. For example, in some cases of output apparatuses not supporting BT.2020 colorimetry in the payload ID when outputting a BT.2020 signal, the output apparatuses add 0, which is data indicating BT.709, as data of the colorimetry.

Some of the conventional apparatuses, such as video converters, are capable of overwriting transfer characteristics and colorimetry of an output signal with a value manually specified by a user. In a case where an output destination apparatus that receives an output signal does not support tone characteristics specified in metadata of an input signal, a conversion apparatus discussed in Japanese Patent Application Laid-Open No. 2019-47223 converts the input signal into a signal having tone characteristics supported by the output destination apparatus and outputs the converted signal. In this operation, the conversion apparatus adds, as metadata of the output signal, data indicating the converted tone characteristics to the transfer characteristics.

However, the conventional technique has an issue that, if metadata indicating tone characteristics or the color space of an input signal has an error, correction of the metadata is not to be performed.

An error in metadata is not factored in the technique discussed in Japanese Patent Application Laid-Open No. 2019-47223, and the erroneous metadata is sometimes outputted to an output destination apparatus without being corrected.

SUMMARY OF THE DISCLOSURE

According to an aspect of the present disclosure, a signal processing apparatus includes one or more memories storing instructions, and one or more processors executing the instructions to acquire metadata from a video signal, detect an error of the metadata, and correct, in a case where the error has been detected, the error of the metadata.

Further features of the present disclosure will become apparent from the following description of exemplary embodiments with reference to the attached drawings.

BRIEF DESCRIPTION OF THE DRAWINGS

FIG. 2 is a table illustrating an example of image quality setting information according to the first exemplary embodiment.

FIG. 4 is a table illustrating an example of error correction of metadata according to the first exemplary embodiment.

FIG. 5 is a table illustrating an example of output setting information according to the first exemplary embodiment.

FIG. 8 is an example of a flowchart illustrating processing that is performed by a display apparatus according to the second exemplary embodiment.

FIG. 9 is an example of a flowchart illustrating processing that is performed by a display apparatus according to the third exemplary embodiment.

FIGS. 10A to 10C are diagrams illustrating luminance histogram characteristics of various tone characteristics according to the third exemplary embodiment.

DESCRIPTION OF THE EMBODIMENTS

Hereinafter, an exemplary embodiment of the present disclosure will be described. Although an example in which a display apparatus includes a signal processing apparatus according to the present exemplary embodiment will be described, the signal processing apparatus according to the present exemplary embodiment may be an information processing apparatus (for example, a personal computer) provided separately from the display apparatus.

Figure 1:
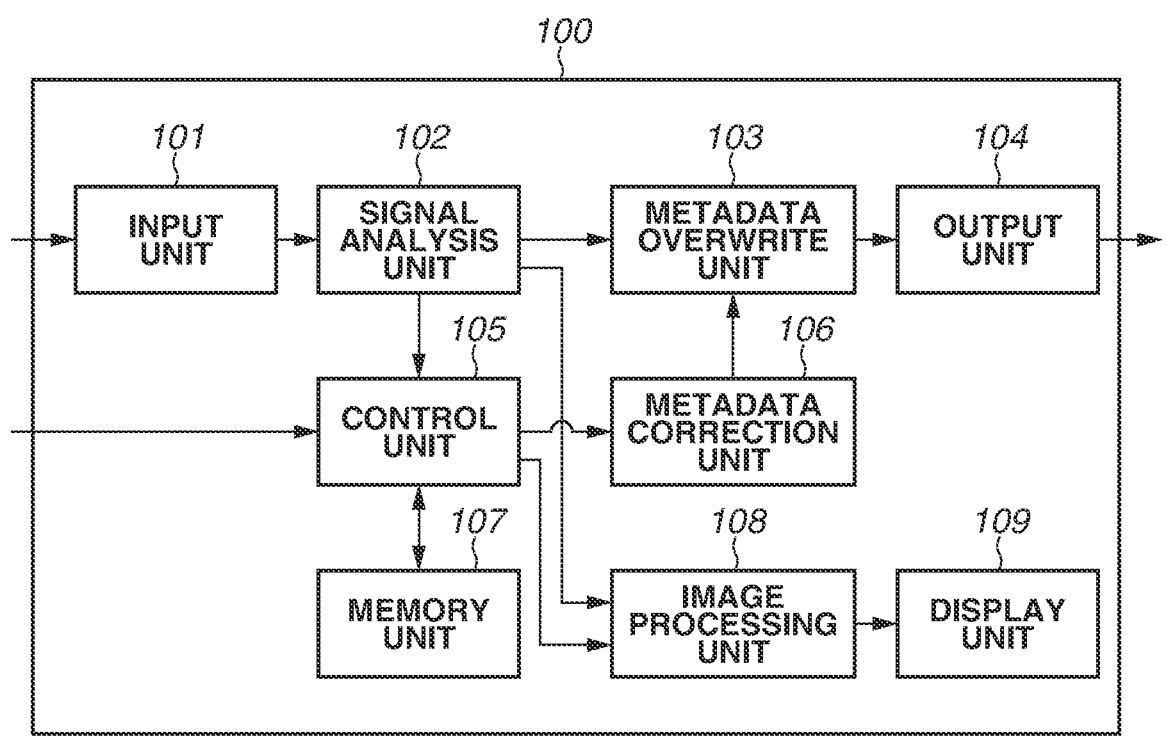
FIG. 1 is a block diagram illustrating a configuration example of a display apparatus according to a first exemplary embodiment.

FIG. 1 is a block diagram illustrating a configuration example of a display apparatus 100 according to a first exemplary embodiment. The display apparatus 100 in FIG. 1 includes an input unit 101, a signal analysis unit 102, a metadata overwrite unit 103, an output unit 104, a control unit 105, a metadata correction unit 106, a memory unit 107, an image processing unit 108, and a display unit 109.

The input unit 101 acquires video data and outputs the video data to the signal analysis unit 102. In the present exemplary embodiment, the input unit 101 acquires frame image data from an external apparatus per video frame. Next, the input unit 101 outputs the acquired frame image data to the signal analysis unit 102. Examples of the input unit 101 include an input terminal compatible with the standards, such as Serial Digital Interface (SDI) and High-Definition Multimedia Interface (HDMI). Examples of the external apparatus include an imaging apparatus and a reproduction apparatus. The display apparatus 100 may include a storage unit storing video data, and the input unit 101 may acquire video data stored in the storage unit.

The signal analysis unit 102 acquires the video data outputted from the input unit 101, outputs the video data to the metadata overwrite unit 103, analyzes the video data, and outputs a result of the analysis to the control unit 105. Specifically, the signal analysis unit 102 acquires metadata from the video data and outputs the acquired metadata to the control unit 105 as the analysis result. The metadata is, for example, ancillary (ANC) data defined in SDI, a payload ID, or data stored in InfoFrame defined in HDMI.

The metadata overwrite unit 103 overwrites the original metadata of the video data outputted from the signal analysis unit 102 with the metadata outputted from the metadata correction unit 106. In this way, the metadata overwrite unit 103 generates video data in which the metadata has been corrected (corrected video data). Next, the metadata overwrite unit 103 outputs the corrected video data to the output unit 104. In a case where no metadata is outputted from the metadata correction unit 106, the metadata overwrite unit 103 outputs the video data outputted from the signal analysis unit 102 to the output unit 104.

The output unit 104 outputs the target video data to the external apparatus. Examples of the output unit 104 include an output terminal compatible with the standards, such as SDI and HDMI.

The control unit 105 controls processing of an individual block of the display apparatus 100. The memory unit 107 stores programs, parameters, etc. For example, the control unit 105 is an arithmetic processing circuit that controls processing of the individual blocks of the display apparatus 100 by executing programs stored in the memory unit 107. In response to a user operating a button or the like (not illustrated) (a user operation) on the display apparatus 100, the control unit 105 may acquire operating information corresponding to the user operation. Next, based on the operating information, the control unit 105 may perform switching of the control or detailed setting of the control, for example.

In the present exemplary embodiment, for example, based on the analysis result outputted from the signal analysis unit 102 or based on a user operation performed on the display apparatus 100, the control unit 105 controls processing of the metadata correction unit 106 and the image processing unit 108. Specifically, based on a user operation, the control unit 105 determines a setting of how an error of metadata in an output signal is detected and corrected. The control unit 105 outputs the determined setting information to the metadata correction unit 106. In addition, based on a user operation, the control unit 105 determines setting information about, for example, the gamma/Electro Optical Transfer Function (EOTF), which is for a display image quality setting, and the color gamut, which is for a display image quality setting. Next, the control unit 105 outputs the determined setting information to the image processing unit 108. In addition, the control unit 105 outputs the determined setting information and the analysis result outputted from the signal analysis unit 102 to the metadata correction unit 106. Immediately after the display apparatus 100 is started, initial setting information may be set, or the previous setting may be continuously set.

The metadata correction unit 106 detects and corrects an error of metadata. In the present exemplary embodiment, based on the analysis result (metadata) and the setting information (image quality information) outputted from the control unit 105, the metadata correction unit 106 performs the detection and correction of an error of metadata. In a case where the metadata correction unit 106 has corrected metadata, the metadata correction unit 106 outputs the corrected metadata to the metadata overwrite unit 103.

The memory unit 107 stores programs, parameters, etc. The programs and parameters stored in the memory unit 107 are called by various blocks of the display apparatus 100.

Based on the setting information outputted from the control unit 105, the image processing unit 108 performs image processing on the video data outputted from the signal analysis unit 102. In this way, the image processing unit 108 generates processed video data. Then, the image processing unit 108 outputs the processed video data to the display unit 109.

FIG. 2 is a table illustrating examples of image quality setting items according to the present exemplary embodiment. Examples of the image quality setting items include gamma/EOTF and color gamut. Specifically, 2.2, Hybrid Log Gamma (HLG), or Perceptual Quantizer (PQ) is settable as the setting item of the gamma/EOTF, and BT.709 or BT.2020 is settable as the setting item of the color gamut. In a case where 2.2 is set as the gamma/EOTF, the image processing unit 108 processes the video data as gamma 2.2 data of Standard Dynamic Range (SDR). In a case where HLG is set as the gamma/EOTF, the image processing unit 108 processes the video data as HLG data of High Dynamic Range (HDR). In a case where PQ is set as the gamma/EOTF, the image processing unit 108 processes the video data as PQ data of HDR. In a case where BT.709 is set as the color gamut, the image processing unit 108 processes the video data as BT.709 data. In a case where BT.2020 is set as the color gamut, the image processing unit 108 processes the video data as BT.2020 data. The image processing unit 108 converts the video data based on the set gamma/EOTF and the set color gamut.

The display unit 109 displays a video image on its display based on the video data outputted from the image processing unit 108. Examples of the display unit 109 include a liquid crystal display unit including a liquid crystal panel and a backlight unit and an organic electroluminescent (EL) display panel.

Figure 3:
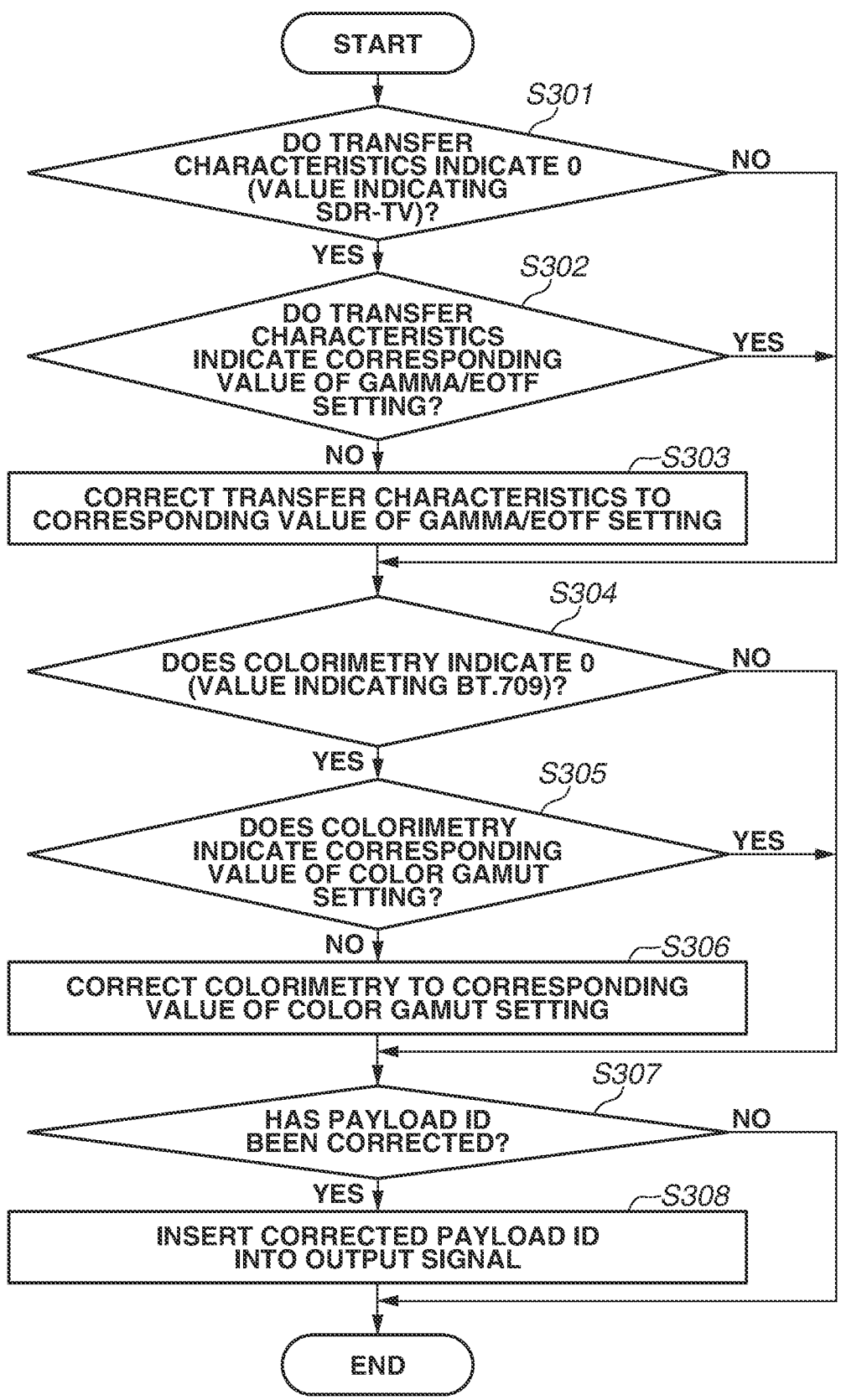
FIG. 3 is an example of a flowchart illustrating processing that is performed by the display apparatus according to the first exemplary embodiment.

FIG. 3 is a flowchart illustrating an example of processing that is performed by the display apparatus 100. When frame image data acquired by the input unit 101 is updated and the metadata correction unit 106 is notified of an analysis result obtained by the signal analysis unit 102, the processing illustrated in FIG. 3 is started. The processing illustrated in FIG. 3 is also started when setting information, such as the gamma/EOTF or the color gamut, is changed by a user operation and the metadata correction unit 106 is notified of the changed setting information.

In step S301, the metadata correction unit 106 determines whether the transfer characteristics in the payload ID indicate 0 (data indicating SDR-TV). In a case where the transfer characteristics indicate 0, there is a possibility that, although the tone characteristics of the signal indicate HLG or PQ, the external apparatus not supporting HLG or PQ of the transfer characteristics has added 0 to the transfer characteristics and has outputted the signal. That is, in this case, the transfer characteristics may be erroneous. In step S301, in a case where the metadata correction unit 106 determines that the transfer characteristics indicate 0 (YES in step S301), the processing proceeds to step S302. In a case where the metadata correction unit 106 determines that the transfer characteristics do not indicate 0 (NO in step S301), the processing proceeds to step S304.

In step S302, the metadata correction unit 106 determines whether the transfer characteristics in the payload ID indicate a corresponding value of the gamma/EOTF setting serving as the image quality setting. For example, in a case where the gamma/EOTF setting is gamma 2.2, the corresponding value of the transfer characteristics is SDR-TV. In a case where the gamma/EOTF setting is HLG, the corresponding value of the transfer characteristics is HLG. In a case where the gamma/EOTF setting is PQ, the corresponding value of the transfer characteristics is PQ. In step S302, in a case where the metadata correction unit 106 determines that the transfer characteristics do not indicate a corresponding value of the gamma/EOTF setting serving as the image quality setting (NO in step S302), the processing proceeds to step S303. In a case where the metadata correction unit 106 determines that the transfer characteristics indicate a corresponding value of the gamma/EOTF setting (YES in step S302), the processing proceeds to step S304.

In step S303, the metadata correction unit 106 corrects the transfer characteristics in the payload ID to a corresponding value of the gamma/EOTF setting serving as an image quality setting.

FIG. 4 is a table illustrating an example of a correspondence relationship among the transfer characteristics in a payload ID, the gamma/EOTF setting serving as the image quality setting, and the correction result in step S303. As illustrated in FIG. 4, in a case where the transfer characteristics in the payload ID indicate 0, and when the gamma/EOTF setting serving as the image quality setting does not indicate gamma 2.2, the payload ID is corrected in step S303. In a case where the transfer characteristics do not indicate 0, that is, in a case where the transfer characteristics indicate data indicating HLG or PQ, the payload ID is not to be corrected in the present exemplary embodiment. The reason why the payload ID is not to be corrected is that, in a case of the transfer characteristics not indicating 0, there is a possibility that the output apparatus supports the transfer characteristics and a value other than 0 has been added intentionally.

In step S304, the metadata correction unit 106 determines whether the colorimetry in the payload ID indicates 0 (data indicating BT.709). In a case where the colorimetry indicates 0, there is a possibility that, although the color gamut of the signal is BT.709 or BT.2020, the external apparatus not supporting BT.709 or BT.2020 of the colorimetry has added 0 to the colorimetry and has outputted the signal. That is, in this case, there is a possibility that the colorimetry is erroneous. In step S304, in a case where the metadata correction unit 106 determines that the colorimetry indicates 0 (YES in step S304), the processing proceeds to step S305. In a case where the metadata correction unit 106 determines that the colorimetry does not indicate 0 (NO in step S304), the processing proceeds to step S307.

In step S305, the metadata correction unit 106 determines whether the colorimetry in the payload ID indicates a corresponding value of the color gamut setting serving as the image quality setting. For example, in a case where the color gamut setting is BT.709, the corresponding value of the colorimetry is BT.709. In a case where the color gamut setting is BT.2020, the corresponding value of the colorimetry is BT.2020. In a case where the metadata correction unit 106 determines that the colorimetry does not indicate a corresponding value of the color gamut setting serving as the image quality setting (NO in step S305), the processing proceeds to step S306. In a case where the metadata correction unit 106 determines that the colorimetry indicates a corresponding value of the color gamut setting (YES in step S305), the processing proceeds to step S307.

In step S306, the metadata correction unit 106 corrects the colorimetry in the payload ID to the corresponding value of the color gamut setting serving as the image quality setting.

In step S307, the metadata correction unit 106 determines whether the processing of step S303 and/or 306 has been performed and the payload ID has been corrected. In step S307, in a case where the metadata correction unit 106 determines that the correction of the payload ID has been performed (YES in step S307), the processing proceeds to step S308. In a case where the metadata correction unit 106 determines that the correction of the payload ID has not been performed (NO in step S307), the processing ends.

In step S308, the metadata correction unit 106 outputs the corrected payload ID to the metadata overwrite unit 103. The metadata overwrite unit 103 inserts the payload ID inputted from the metadata correction unit 106 into the video data inputted from the signal analysis unit 102 by overwriting the original video data with the corrected video data.

As described above, according to the present exemplary embodiment, metadata of video data is acquired. Then, based on the metadata and the image quality setting, detection of whether the metadata is erroneous is performed. In a case where the metadata is erroneous, the metadata is corrected. The corrected metadata is inserted into the signal by overwriting the original signal with the corrected signal. In this way, in a case where the metadata is erroneous, the user does not need to manually set and correct information indicating the tone characteristics and the color space of the metadata.

In the above description, a correction method for automatically detecting and correcting an error of metadata has been described. Alternatively, a user may set a correction method from among a plurality of correction methods including the above-described method and other methods.

FIG. 5 is a table illustrating examples of output setting items according to the present exemplary embodiment. A metadata correction type is used as an output setting item. In a case where "auto" is set as the metadata correction type, the above-described processing is performed. In a case where an item other than "auto" is set, processing based on a different correction method is performed. Hereinafter, "coordination with image quality setting", "manual", and "off" will be described as examples of correction type items that start processing based on other correction methods. In a case where "coordination with image quality setting" is set, the detection of an error of the metadata is not performed. In this setting, the metadata is forcibly corrected based on the image quality setting. In a case where "manual" is set, the metadata is corrected based on the values set in the items of the transfer characteristics and colorimetry among output setting items.

For example, SDR-TV, HLG, or PQ are settable for the item of the transfer characteristics, and BT.709 or BT.2020 are settable for the item of the colorimetry. In a case where "Off" is set, the processing for correcting an error of metadata is not to be performed.

The above description has been given using an example case in which the transfer characteristics and the colorimetry are used as the metadata on which the error detection and correction are performed. However, the metadata on which the error detection and correction are performed is not limited to the transfer characteristics and the colorimetry. For example, in a case where the bit depth in the payload ID indicates 0, and in a case where the value does not correspond to the bit depth setting or the range setting, such as full range/limited range, it may be determined that the metadata is erroneous, and the metadata may be corrected based on the bit depth setting or the range setting. For example, "10-bit full range", "10-bit narrow range", "12-bit full range", and "12-bit narrow range" are used as parameters for the bit depth. In a case where the image quality setting is set "12 bit" and "limited range", "12-bit narrow range" is set by correction of the bit depth in the payload ID based on the image quality setting.

Figure 6:
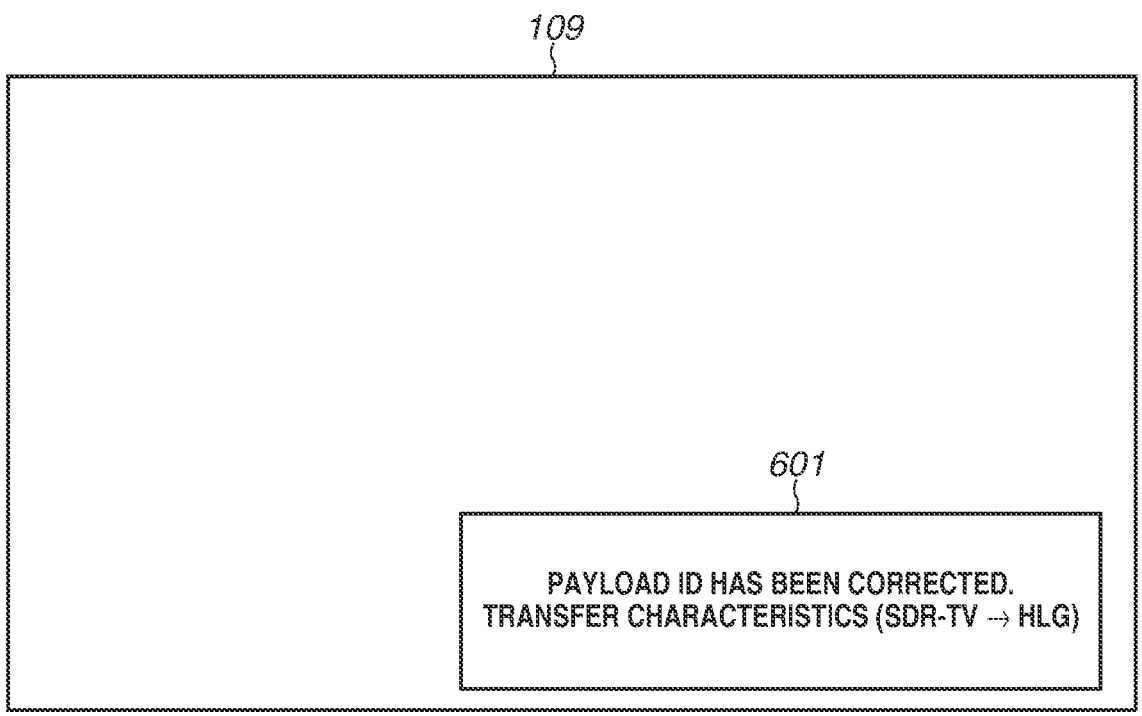
FIG. 6 is a diagram illustrating an example of a correction notification message according to the first exemplary embodiment.

In a case where metadata has been corrected, the user may be notified of the correction result. The notification may be realized by a notification message displayed on the display unit 109, for example. FIG. 6 is an example of a notification message displayed on the display unit 109. As illustrated in FIG. 6, the display unit 109 displays a notification message 601 in such a manner that the user can check the message.

Figure 7:
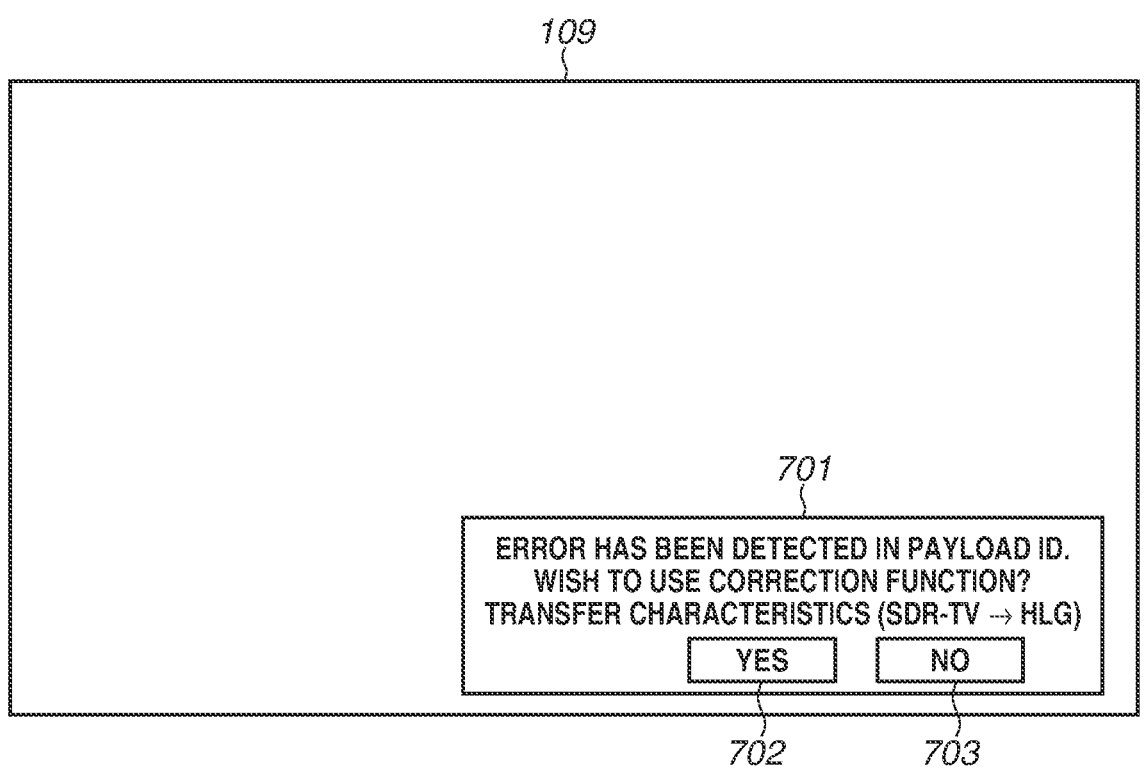
FIG. 7 is a diagram illustrating an example of a correction check message according to the first exemplary embodiment.

In a case where an error of metadata has been detected, the user may be asked whether to correct the metadata. For example, this may be realized by a check message displayed on the display unit 109, which allows the user to determine whether to use the corrected metadata. FIG. 7 is an example of a check message displayed on the display unit 109. As illustrated in FIG. 7, the display unit 109 displays a check message 701 in such a manner that the user can select a YES button 702 when the user uses the corrected metadata and can select a NO button 703 when the user does not use the corrected metadata.

Each block according to the present exemplary embodiment (FIG. 1) may be or may not be an individual hardware. The functions of two or more blocks may be realized by a shared hardware. A plurality of functions of one block may each be realized by an individual hardware. Two or more functions of one block may be realized by a shared hardware. Each block may be or may not be realized by hardware. For example, an apparatus may include a processor and a memory storing a control program. The function of at least one block of the apparatus may be realized by causing the processor to read the control program from the memory and to execute the control program.

The present exemplary embodiment, including the modifications, which will be described below, is only an example. The configurations that can be obtained by suitably changing or modifying the configuration of the present exemplary embodiment within the scope of the gist of the present disclosure are also included in the present disclosure.

In a second exemplary embodiment, in a case where a display apparatus detects metadata of a camera (hereinafter referred to as "camera metadata"), which is added to ANC data of SDI and uniquely defined by an individual camera maker, the display apparatus corrects the payload ID based on the camera metadata. Since it can be considered that the data that has been added to the camera metadata is an intentionally added value, the display apparatus determines that reliability is higher than data in the payload ID and corrects the payload ID by using the camera metadata.

The similar steps as those according to the first exemplary embodiment will be denoted by the same reference characters, and the redundant description will be omitted.

FIG. 8 is a flowchart illustrating an example of processing that is performed by a display apparatus 100 according to the second exemplary embodiment. For example, when frame image data acquired by the input unit 101 is updated and when the metadata correction unit 106 is notified of an analysis result obtained by the signal analysis unit 102, the processing illustrated in FIG. 8 is started.

In step S801, the metadata correction unit 106 determines whether data corresponding to the transfer characteristics has been added to the camera metadata. The data corresponding to the transfer characteristics is data with which whether the video data is SDR, HLG, or PQ can be determined. In step S801, in a case where the metadata correction unit 106 determines that the data corresponding to the camera metadata has been added (YES in step S801), the processing proceeds to step S802. In a case where the metadata correction unit 106 determines that the data corresponding to the camera metadata has not been added (NO in step S801), the processing proceeds to step S307.

In step S802, the metadata correction unit 106 determines whether the transfer characteristics match a corresponding value of the camera metadata. In a case where the metadata correction unit 106 determines that the transfer characteristics do not match a corresponding value of the camera metadata (NO in step S802), the processing proceeds to step S803. In a case where the metadata correction unit 106 determines that the transfer characteristics match a corresponding value of the camera metadata (YES in step S802), the processing proceeds to step S307.

In step S803, the metadata correction unit 106 corrects the transfer characteristics to a corresponding value of the camera metadata.

As described above, according to the present exemplary embodiment, metadata of a video signal is acquired. Then, in a case where camera metadata is detected from the metadata, the payload ID of the metadata corrected based on the camera metadata is inserted into the signal by overwriting the original signal with the corrected signal. In this way, in a case where the payload ID of metadata is erroneous, the user does not need to perform the output setting for the metadata.

In the above example, the transfer characteristics in a payload ID are used as the correction target metadata. However, the correction target metadata is not limited to the transfer characteristics. For example, as in the first exemplary embodiment, an error of the colorimetry or the bit depth in a payload ID may be detected and corrected.

In a third exemplary embodiment, a display apparatus performs image analysis on frame image data, estimates tone characteristics of the signal, corrects, based on the estimated tone characteristics, the payload ID of the metadata, and changes the image quality setting. The similar steps as those according to the first exemplary embodiment will be denoted by the same reference characters, and the redundant description will be omitted.

According to the present exemplary embodiment, the number of pixels in a frame of an input video signal is calculated per luminance value, and based on the number of pixels of the frame per luminance value, the tone characteristics of the input video signal are determined.

In the case of an SDR video signal, luminance values in a wide range are used on the whole screen. In the case of an HDR video signal, there is a small number of scenes in which high luminance is used on the whole screen. Instead, high luminance is often used on only a limited part of the screen, such as for the luster of a metallic material or the glitter on a water surface. Examples of the HDR technique include HLG and PQ, and the difference between HLG and PQ is that the luminance of HLG is the relative luminance (the maximum luminance is the same luminance as the maximum luminance of the display apparatus), and the luminance of PQ is the absolute luminance (the maximum luminance is 10000 nits). The maximum luminance of a current HDR display apparatus is about 1000 nits, and in some cases, PQ contents are adjusted so that a small number of pixels have high luminance values higher than or equal to a predetermined luminance value (for example, 1000 nits or more).

FIG. 9 is a flowchart illustrating an example of processing that is performed by a display apparatus 100 according to the third exemplary embodiment. For example, when frame image data acquired by the input unit 101 is updated and when the frame image data is inputted to the signal analysis unit 102, the processing in FIG. 9 is started.

In step S901, the signal analysis unit 102 performs signal analysis on the frame image data and determines the tone characteristics.

The signal analysis unit 102 calculates a luminance histogram from the frame image data. FIG. 10A is a diagram illustrating the luminance histogram (the luminance appearance frequency) of a regular SDR video signal. FIG. 10B is a diagram illustrating the luminance histogram (the luminance appearance frequency) of a regular HLG video signal. FIG. 10C is a diagram illustrating the luminance histogram (the luminance appearance frequency) of a regular PQ video signal.

As illustrated in FIG. 10A, in SDR, a wide range of luminance values are used. As illustrated in FIG. 10B, in HLG, the SDR luminance range is large, and the HDR luminance range is small.

As illustrated in FIG. 10C, in PQ, the SDR luminance range is large, and the HDR luminance range is small. In addition, the high luminance range (for example, 1000 nits or more) is even smaller.

Thus, from the calculated luminance histogram, the number of pixels in the SDR luminance range is compared with the number of pixels in the HDR luminance range. In a case where the difference between the number of SDR pixels and the number of HDR pixels is less than a threshold, the signal analysis unit 102 determines that the tone characteristics is SDR. In a case where the difference between the number of SDR pixels and the number of HDR pixels is equal to or more than the threshold, the number of pixels in the high luminance range (pixel areas whose luminance values are 1000 nits or more, for example) is compared with the number of pixels in the low luminance range in the HDR luminance range. The low luminance range corresponds to the pixel areas whose luminance is less than a predetermined luminance value. In a case where the difference between the number of pixels in the high luminance range and the number of pixels in the low luminance range in the HDR range is less than the threshold, the signal analysis unit 102 determines that the tone characteristics is HLG. In a case where the difference between the number of pixels in the high luminance range and the number of pixels in the low luminance range in the HDR range is equal to or more than the threshold, the signal analysis unit 102 determines that the tone characteristics is PQ.

Although the determination of the tone characteristics can be performed even with image data of one frame, image data of a predetermined number of frames (for example, 100 frames) may be used to determine the tone characteristics. In this case, differences between the number of SDR pixels and the number of HDR pixels or differences between the number of pixels in the high luminance range and the number of pixels in the low luminance range in the HDR range are obtained in the predetermined number of frames. Then the differences are divided by the predetermined number of frames to obtain an average value, and this average value may be used to determine the tone characteristics.

In a case where a stable determination result cannot be obtained, for example, with the reason that the tone characteristics determination result changes per frame, the signal analysis unit 102 may output indeterminable as the determination result.

The signal analysis unit 102 outputs the determination result to the control unit 105, and the control unit 105 outputs the determination result to the metadata correction unit 106.

In step S902, the metadata correction unit 106 determines whether the determination result inputted from the signal analysis unit 102 is determinable. In a case where the metadata correction unit 106 determines that the determination result is determinable (YES in step S902), the processing proceeds to step S903. In a case where the metadata correction unit 106 determines that the determination result is undeterminable (NO in step S902), the processing proceeds to step S307.

In step S903, the metadata correction unit 106 determines whether the transfer characteristics in the payload ID match the tone characteristics determination result. In a case where the metadata correction unit 106 determines that the transfer characteristics do not match the determination result (NO in step S903), the processing proceeds to step S904. In a case where the metadata correction unit 106 determines that the transfer characteristics match the determination result (YES in step S903), the processing proceeds to step S307.

In step S904, the metadata correction unit 106 corrects the transfer characteristics in the payload ID to the tone characteristics determination result.

In step S905, the image processing unit 108 changes the image quality setting based on the corrected payload ID. For example, in a case where the image quality setting gamma/EOTF has been set to 2.2 and the tone characteristics determination result is HLG, the image processing unit 108 changes the image quality setting gamma/EOTF from 2.2 to HLG.

As described above, according to the third exemplary embodiment, signal analysis is performed on frame image data, and the tone characteristics are determined. In a case where the tone characteristics are determinable, the payload ID is corrected based on the tone characteristics determination result. The corrected payload ID is inserted into the signal, and the image quality setting is changed based on the corrected payload ID. In this way, even if the payload ID of metadata is erroneous, the user does not need to perform the output setting for the metadata. In addition, in a case where the image quality setting gamma/EOTF does not match to the tone characteristics of the signal, the user does not need to change the image quality setting gamma/EOTF.

While an example using a luminance histogram as the analysis method has been described, the analysis method is not limited to use of a luminance histogram. For example, a machine learning model for estimating tone characteristics from frame image data may be prepared, and metadata may be corrected based on an estimated value of the tone characteristics.

While an example using the transfer characteristics in a payload ID as the correction target metadata has been described, the correction target metadata is not limited to the transfer characteristics. For example, as in the first exemplary embodiment, the colorimetry or the bit depth in the payload ID may be analyzed and corrected.

The present disclosure can be realized by supplying a program that realizes one or more functions according to the above-described exemplary embodiments to a system or an apparatus via a network or a storage medium and by causing one or more processors of a computer in the system or the apparatus to read and execute the program. The exemplary embodiments of the present disclosure may be realized by a circuit (for example, an application specific integrated circuit (ASIC)) that realizes one or more functions.

The present disclosure is not limited to the above-described exemplary embodiments. In the implementation phase, the present disclosure can be embodied by modifying at least one of the components without departing from the scope of the present disclosure. In addition, various inventions can be formed by suitably combining a plurality of components disclosed in the above-describe exemplary embodiments. For example, some of the components may be removed from the components described in the exemplary embodiments. In addition, components of different exemplary embodiments may suitably be combined together.

In the above-described exemplary embodiments, "at least one of A and B" also means A and/or B.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-190840, filed Nov. 29, 2022, which is hereby incorporated by reference herein in its entirety.

What is claimed is:

1. A signal processing apparatus comprising:
one or more memories storing instructions; and
one or more processors executing the instructions to
acquire metadata from a video signal,
detect an error of the metadata,
correct, in a case where the error has been detected, the error of the metadata, and
analyze metadata of an input video signal,
wherein, in a case where the acquired metadata does not correspond with a result of the analysis, the one or more processors determines that the metadata is erroneous,
wherein the one or more processors correct the metadata to a corresponding value based on the result of the analysis,
wherein the one or more processors determine whether tone characteristics of the video signal indicate Standard Dynamic Range (SDR), Hybrid Log Gamma (HLG), or Perceptual Quantizer (PQ), based on the number of pixels in a frame per luminance value,
wherein, in a case where a difference between the number of pixels whose luminance value is a predetermined luminance value or more and the number of pixels whose luminance value is less than the predetermined luminance value is less than a threshold, the one or more processors determine that the tone characteristics of the video signal is SDR,
wherein correction of the error of the metadata includes automatically inserting a corrected video signal by overwriting the video signal without a user input indicating tone characteristics.

2. The signal processing apparatus according to claim 1, wherein, in a case where a value of the metadata is 0 and does not correspond with an image quality setting, the one or more processors determine that the metadata is erroneous, and
wherein the one or more processors correct the metadata to a corresponding value based on the image quality setting.

3. The signal processing apparatus according to claim 1, wherein the metadata is transfer characteristics in a payload ID of Serial Digital Interface (SDI), and an image quality setting is a setting indicating tone characteristics of a gamma/EOTF setting.

4. The signal processing apparatus according to claim 1, wherein the metadata is colorimetry in a payload ID of SDI, and an image quality setting is a setting indicating a color space of a color gamut setting.

5. The signal processing apparatus according to claim 1, wherein the metadata is a bit depth in a payload ID of SDI, and an image quality setting is a bit depth setting or a range setting for a full range/limited range.

6. The signal processing apparatus according to claim 1, wherein the metadata is data indicating a payload ID of SDI, and in a case where the data indicating the payload ID does not correspond with data indicating metadata of a camera, the data indicating the payload ID is detected as an error, and
wherein the one or more processors correct the metadata to a corresponding value based on the data indicating the metadata of the camera.

7. The signal processing apparatus according to claim 1, wherein, in a case where the one or more processors do not determine that the tone characteristics of the video signal is SDR, and in a case where, among the pixels whose luminance value is the predetermined luminance value or more in the frame, a difference between the number of pixels whose luminance value is a second predetermined luminance value or more and the number of pixels whose luminance value is less than the second predetermined luminance value is less than a second threshold, the one or more processors determine that the tone characteristics of the signal is HLG, and wherein, in a case where the one or more processors do not determine that the tone characteristics of the video signal indicate SDR, and in a case where, among the pixels whose luminance value is the predetermined luminance value or more in the frame, the difference between the number of pixels whose luminance value is the second predetermined luminance value or more and the number of pixels whose luminance value is less than the second predetermined luminance value is a second threshold or more, the one or more processors determine that the tone characteristics of the signal is PQ.

8. The signal processing apparatus according to claim 1, wherein the one or more processors further execute the instructions to notify, in a case where the error of the metadata has been corrected, a user of a corrected result.

9. The signal processing apparatus according to claim 1, wherein the one or more processors further execute the instructions to ask, in a case where the error of the metadata in the signal has been detected, a user about whether to correct the metadata, and wherein, in a case where the user determines to correct the metadata, the one or more processors correct the metadata.

10. The signal processing apparatus according to claim 1, wherein the one or more processors further execute the instructions to rewrite the metadata of the video signal by using correct metadata, and output the video signal whose metadata has been rewritten.

11. The signal processing apparatus according to claim 1, wherein the one or more processors further execute the instructions to change an image quality setting, based on the corrected metadata.

12. A control method of a signal processing apparatus, the control method comprising:

acquiring metadata from a video signal;

detecting an error of the metadata;

correcting, in a case where the error has been detected, the error of the metadata; and analyzing metadata of an input video signal, wherein, in a case where the acquired metadata does not correspond with a result of the analysis, determining that the metadata is erroneous, wherein the metadata is corrected to a corresponding value based on the result of the analysis, determining whether tone characteristics of the video signal indicate Standard Dynamic Range (SDR), Hybrid Log Gamma (HLG), or Perceptual Quantizer (PQ), based on the number of pixels in a frame per luminance value, wherein, in a case where a difference between the number of pixels whose luminance value is a predetermined luminance value or more and the number of pixels whose luminance value is less than the predetermined luminance value is less than a threshold, determining that the tone characteristics of the video signal is SDR, wherein correction of the error of the metadata includes automatically inserting a corrected video signal by overwriting the video signal without a user input indicating tone characteristics.

13. A non-transitory recording medium storing a program for causing a signal processing apparatus to execute a control method, the control method comprising:

acquiring metadata from a video signal;

detecting an error of the metadata;

correcting, in a case where the error has been detected, the error of the metadata; and analyzing metadata of an input video signal, wherein, in a case where the acquired metadata does not correspond with a result of the analysis, determining that the metadata is erroneous, correcting the metadata to a corresponding value based on the result of the analysis, determining whether tone characteristics of the video signal indicate Standard Dynamic Range (SDR), Hybrid Log Gamma (HLG), or Perceptual Quantizer (PQ), based on the number of pixels in a frame per luminance value, wherein, in a case where a difference between the number of pixels whose luminance value is a predetermined luminance value or more and the number of pixels whose luminance value is less than the predetermined luminance value is less than a threshold, determining that the tone characteristics of the video signal is SDR, wherein correction of the error of the metadata includes automatically inserting a corrected video signal by overwriting the video signal without a user input indicating tone characteristics.

* * * * *